(12) United States Patent
Smith

(10) Patent No.: US 8,340,064 B2
(45) Date of Patent: Dec. 25, 2012

(54) WIRELESS SYSTEM FOR COMMUNICATION

(75) Inventor: Mark Jeffrey Smith, San Antonio, TX (US)

(73) Assignee: Belair Network Inc. (CA)

( * ) Notice: Subject to any disclaimer, the term of this patent is extended or adjusted under 35 U.S.C. 154(b) by 0 days.

(21) Appl. No.: 12/964,113

(22) Filed: Dec. 9, 2010

(65) Prior Publication Data

US 2011/0164600 A1    Jul. 7, 2011

Related U.S. Application Data

(63) Continuation of application No. 12/246,525, filed on Oct. 7, 2008, now abandoned, which is a continuation of application No. 10/760,610, filed on Jan. 20, 2004, now Pat. No. 7,433,361, and a continuation of application No. 10/760,866, filed on Jan. 20, 2004, now Pat. No. 7,433,343.

(60) Provisional application No. 60/471,978, filed on May 20, 2003.

(51) Int. Cl.
    *H04W 4/00*    (2009.01)
(52) U.S. Cl. ........................................ 370/338; 370/328
(58) Field of Classification Search .................. 370/310, 370/338
    See application file for complete search history.

(56) References Cited

U.S. PATENT DOCUMENTS

| | | |
|---|---|---|
| 3,359,460 A | 12/1967 | Ragone et al. |
| 4,837,820 A | 6/1989 | Bellavia, Jr. |
| 5,528,582 A | 6/1996 | Bodeep et al. |
| 5,581,801 A | 12/1996 | Spriester et al. |
| 5,737,194 A * | 4/1998 | Hopkins et al. ............... 361/800 |
| 5,781,844 A | 7/1998 | Spriester et al. |
| 5,930,113 A | 7/1999 | McCann |

(Continued)

FOREIGN PATENT DOCUMENTS

EP    940006 B1    8/2001

(Continued)

OTHER PUBLICATIONS

Stephen Lee, Power line access reviewed, InfoWorld: Jan. 7, 2002: vol. 24: Issue 1; p. 15.

(Continued)

*Primary Examiner* — Derrick Ferris
*Assistant Examiner* — Majid Esmaeilian
(74) *Attorney, Agent, or Firm* — Katten Muchin Rosenman LLP

(57) ABSTRACT

A method of wirelessly communicating from a high speed data modem using a first radio transceiver at a first location and a second radio transceiver at a second location preferably includes: (i) attaching a housing (containing the data modem and the first radio transceiver, a radio processor, and a power supply) to an outdoor supporting structure that supports a coaxial cable carrying an RF signal and AC power; (ii) using a splitter to split the RF signal from the AC power; (iii) transmitting the RF signal to the data modem, and transmitting the AC power to the power supply; (iv) providing a digital signal from the data modem to the radio processor; (v) converting the AC power to DC; (vi) using the DC power to run the data modem, the first radio transceiver, and the radio processor; (vii) communicating the digital signal from the radio processor to the first radio transceiver and then to a first antenna; (viii) transmitting a wireless signal from the first antenna to a second antenna; and (ix) communicating the wireless signal from the second antenna to the second radio transceiver, then to a second radio processor contained in a user device.

60 Claims, 5 Drawing Sheets

U.S. PATENT DOCUMENTS

| | | | |
|---|---|---|---|
| 6,028,769 | A | 2/2000 | Zurek |
| 6,089,881 | A * | 7/2000 | Daoud .......................... 439/92 |
| 6,192,230 | B1 | 2/2001 | van Bokhorst et al. |
| 6,199,207 | B1 | 3/2001 | Jelinek et al. |
| 6,259,933 | B1 | 7/2001 | Bambridge et al. |
| 6,377,782 | B1 | 4/2002 | Bishop et al. |
| 6,411,825 | B1 | 6/2002 | Csapo et al. |
| 6,625,222 | B1 | 9/2003 | Bertonis et al. |
| 6,628,627 | B1 | 9/2003 | Zendle et al. |
| 6,735,450 | B1 | 5/2004 | Remmert |
| 6,785,150 | B1 | 8/2004 | Szilagi et al. |
| 6,785,513 | B1 | 8/2004 | Sivaprakasam |
| 6,788,868 | B2 | 9/2004 | McLain et al. |
| 6,811,447 | B2 | 11/2004 | Pfister et al. |
| 6,862,353 | B2 | 3/2005 | Rabenko et al. |
| 6,870,837 | B2 | 3/2005 | Ho et al. |
| 6,885,674 | B2 | 4/2005 | Hunt et al. |
| 6,910,148 | B1 | 6/2005 | Ho et al. |
| 6,931,659 | B1 | 8/2005 | Kinemura |
| 6,957,047 | B1 | 10/2005 | Young et al. |
| 6,980,089 | B1 | 12/2005 | Kline et al. |
| 7,035,270 | B2 | 4/2006 | Moore, Jr. et al. |
| 7,042,897 | B1 | 5/2006 | Sivaprakasam et al. |
| 7,126,417 | B2 | 10/2006 | Bishop |
| 7,130,625 | B2 | 10/2006 | Akgun et al. |
| 7,149,474 | B1 | 12/2006 | Mikhak |
| 7,162,234 | B1 | 1/2007 | Smith |
| 7,209,771 | B2 * | 4/2007 | Twitchell, Jr. ................ 455/574 |
| 7,230,935 | B2 | 6/2007 | Proctor, Jr. et al. |
| 7,392,424 | B2 | 6/2008 | Ho et al. |
| 7,433,343 | B1 | 10/2008 | Smith |
| 7,433,361 | B1 | 10/2008 | Smith |
| 7,596,798 | B2 | 9/2009 | Bertonis et al. |
| 7,598,857 | B1 | 10/2009 | Reagan et al. |
| 7,646,355 | B2 | 1/2010 | Bishop |
| 7,664,504 | B2 | 2/2010 | Bishop |
| 7,669,323 | B2 | 3/2010 | Pfister et al. |
| 2002/0010866 | A1 | 1/2002 | McCullough et al. |
| 2002/0061012 | A1 | 5/2002 | Thi et al. |
| 2002/0147978 | A1 | 10/2002 | Dolgonos et al. |
| 2003/0021080 | A1 | 1/2003 | Koperda et al. |
| 2003/0033608 | A1 | 2/2003 | Chang et al. |
| 2003/0115610 | A1 | 6/2003 | Cho |
| 2003/0185169 | A1 * | 10/2003 | Higgins ........................ 370/329 |
| 2003/0226017 | A1 | 12/2003 | Palekar et al. |
| 2004/0151282 | A1 | 8/2004 | Jones, III et al. |
| 2004/0204097 | A1 * | 10/2004 | Scheinert et al. ............ 455/561 |
| 2005/0144649 | A1 | 6/2005 | Bertonis et al. |
| 2006/0159114 | A1 | 7/2006 | Bishop |
| 2006/0217076 | A1 | 9/2006 | Bishop |
| 2006/0217138 | A1 | 9/2006 | Bishop |
| 2006/0251017 | A1 | 11/2006 | Bishop |
| 2006/0252378 | A1 | 11/2006 | Bishop |
| 2006/0280176 | A1 | 12/2006 | Bishop |
| 2007/0028280 | A1 | 2/2007 | Bishop |
| 2007/0155403 | A1 | 7/2007 | Bishop |
| 2007/0167171 | A1 | 7/2007 | Bishop |
| 2007/0198702 | A1 | 8/2007 | Bishop |
| 2007/0213049 | A1 | 9/2007 | Bishop |

FOREIGN PATENT DOCUMENTS

| | | | |
|---|---|---|---|
| EP | 1214819 | A1 | 6/2002 |
| EP | 1618694 | A2 | 1/2006 |
| EP | 1884071 | A1 | 2/2008 |
| EP | 1884072 | A1 | 2/2008 |
| EP | 1908190 | A1 | 4/2008 |
| EP | 1989933 | A1 | 11/2008 |
| WO | 9108649 | A1 | 6/1991 |
| WO | 9108650 | A1 | 6/1991 |
| WO | 9108651 | A1 | 6/1991 |
| WO | 9112694 | A1 | 8/1991 |
| WO | 9210038 | A1 | 6/1992 |
| WO | 9210062 | A1 | 6/1992 |
| WO | 9326121 | A1 | 12/1993 |
| WO | 9326122 | A1 | 12/1993 |
| WO | 9326123 | A1 | 12/1993 |
| WO | 9326124 | A1 | 12/1993 |
| WO | 9326125 | A1 | 12/1993 |
| WO | 9326126 | A1 | 12/1993 |
| WO | 9326127 | A1 | 12/1993 |
| WO | 9326128 | A1 | 12/1993 |
| WO | 9326129 | A1 | 12/1993 |
| WO | 9326130 | A1 | 12/1993 |
| WO | 9747082 | A1 | 12/1997 |
| WO | 9747168 | A1 | 12/1997 |
| WO | 0052880 | A1 | 9/2000 |
| WO | 0115396 | A1 | 3/2001 |
| WO | 0247329 | A2 | 6/2002 |
| WO | 02093315 | A2 | 11/2002 |
| WO | 0282743 | A3 | 3/2003 |
| WO | 0282752 | A3 | 2/2004 |
| WO | 2004098117 | A2 | 11/2004 |
| WO | 2004114604 | A2 | 12/2004 |
| WO | 2005053210 | A2 | 6/2005 |
| WO | 2006105060 | A1 | 10/2006 |
| WO | 2006119452 | A1 | 11/2006 |
| WO | 2006119453 | A1 | 11/2006 |
| WO | 2006119454 | A1 | 11/2006 |
| WO | 2007011632 | A1 | 1/2007 |

OTHER PUBLICATIONS

Peter J. Howe, Cisco, Utility to Launch Start-Up See New Way to Get Offer Net Access, The Boston Globe, Jun. 11, 2001.

Allen Fear, Siemens SpeedStream Powerline 802.11b Wireless Access Point, Cnet.com, <URL: http://reviews.cnet.com/wireless-access-points/siemens-speedstream-powerline-802/4505-3265_7-20684674.html#reviewPage1>, product released on Nov. 7, 2002, Reviewed on Feb. 4, 2003; reiview updated on Jul. 5, 2010.

* cited by examiner

WIRELESS SYSTEM FOR COMMUNICATION

CROSS REFERENCE TO RELATED APPLICATIONS

This application is a continuation of U.S. patent application Ser. No. 12/246,525, filed Oct. 7, 2008, which is: (i) a continuation of U.S. patent application Ser. No. 10/760,610, filed on Jan. 20, 2004 (now U.S. Pat. No. 7,433,361, issued Oct. 7, 2008), and (ii) a continuation of U.S. patent application Ser. No. 10/760,866, filed on Jan. 20, 2004 (now U.S. Pat. No. 7,433,343, issued Oct. 7, 2008), both of which claim priority to U.S. Provisional Patent Application Ser. No. 60/471,978 filed May 20, 2003, all of which are expressly incorporated herein by reference. U.S. Pat. No. 7,162,234 to the same inventor also claims priority to U.S. Provisional Patent Application Ser. No. 60/471,978.

FIELD OF THE INVENTION

Embodiments of the invention relate to a commercial modem/router and a wireless system of data communications. The method and system generally uses two radio transceivers for an inexpensive data and communication device usable without the need for construction or hardwiring.

BACKGROUND

Hybrid fiber coaxial networks (HFC networks) are typically used for delivery of television signals to subscribers. Each subscriber represents either an individual or a business and is connected to the cable TV HFC network through a trunk and branch configuration to individual subscribers.

The HFC network can also carry a connection to the Internet, voice, fax and data. To date, customers in business have had great challenges in connecting to the HFC network. The present invention was designed to meet that need.

A need has long existed to expand the serviceable market to provide Internet, voice, fax, and data connectivity. The present invention addresses the need to a less expensive and faster technique to permit customers to access these services over cable in commercial facilities.

Another need in the business was to have a system that can be used through a window so that no roof rights are required by a client for connecting to the HFC network.

BRIEF DESCRIPTION OF THE DRAWINGS

The detailed description will be better understood in conjunction with the accompanying drawings, wherein like reference characters represent like elements, as follows.

The present embodiments are detailed below with reference to the listed Figures.

DETAILED DESCRIPTION OF THE EMBODIMENTS

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

Figure 1:
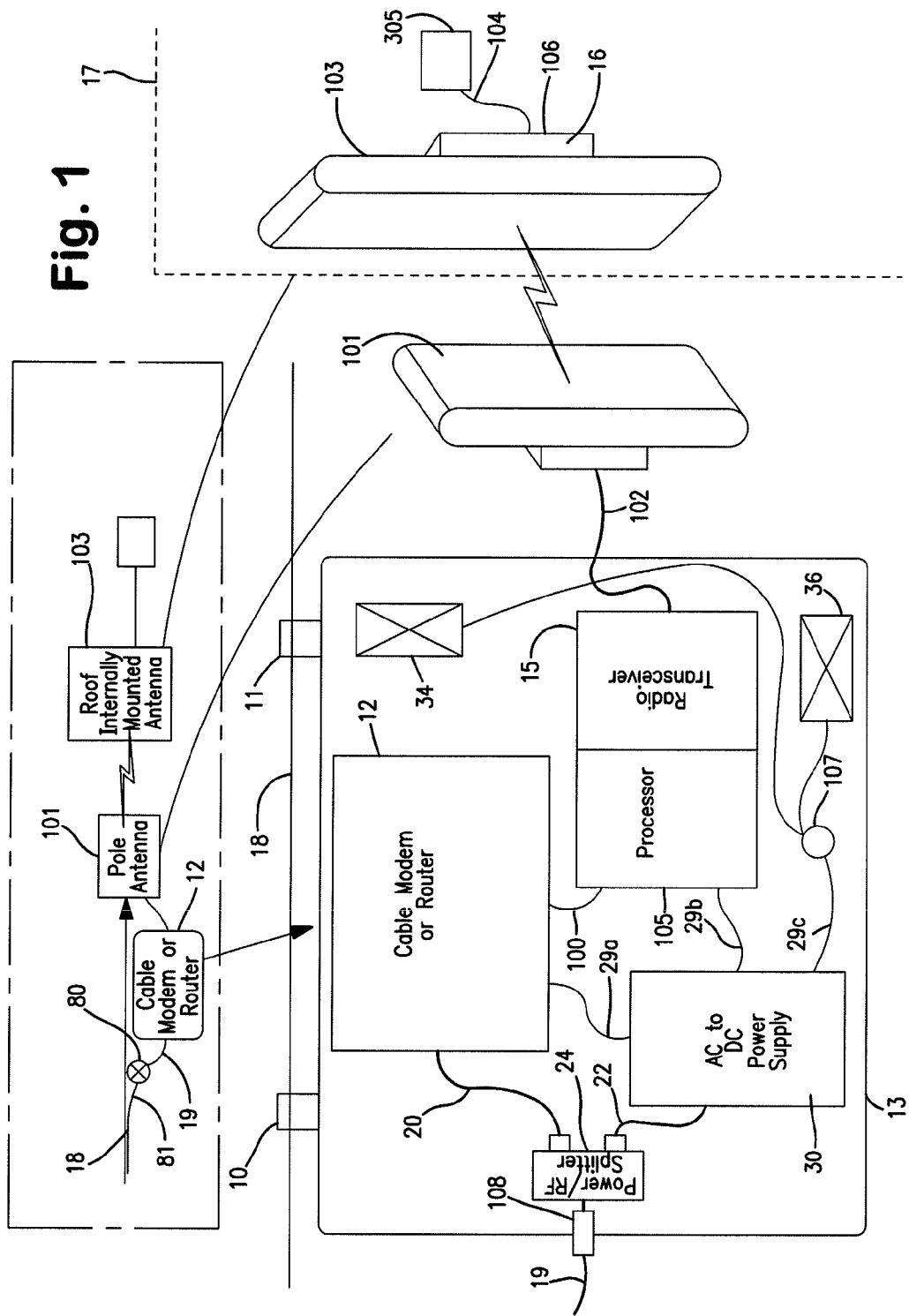
FIG. 1 is a diagram of the equipment usable with the method and system.

FIG. 1 relates to a method and system of wirelessly communicating information from a bidirectional high speed data cable modem/router via a wireless Ethernet connection, which can be a radio transceiver and cable combination to a customer's location.

Wirelessly communicating is preferably radio based communication, but can include infrared, laser based or light based communication. In addition, other electromagnetic frequency communication (microwave) frequency can be used within the scope of this invention.

The method uses a system that is illustrated as a single particular communications channel in FIG. I. Multiple links and channels of those links, such as communications links of wired and wireless channels, can be used in embodiments of the invention described herein.

The method and system generally includes wirelessly communicating information from a bidirectional high speed data modem/router in a housing via an Ethernet connection on a first radio transceiver communicating with a second radio transceiver at a customer's premises, wherein the housing connects to a supporting strand which supports a coaxial cable carrying a RF spectrum signal and AC power.

In an embodiment, wherein the housing can contain a bidirectional high speed data modem operably connected to a first radio transceiver, a first radio processor card, and a switching power supply, wherein the housing is operably connected to a supporting strand and wherein the supporting strand simultaneously supports a coaxial cable carrying an RF spectrum signal and an AC power signal.

The method and system generally includes splitting the signal with an RF/power splitter from the coaxial cable into the RF spectrum signal and the AC power.

The method and system further includes transmitting the RF spectrum signal from the splitter into the bidirectional high speed data modem/router and generating a digital Ethernet signal from the modem/router to the first radio transceiver.

The method and system can further includes at least one heating and cooling device adapted to heat and cool contents of the housing.

In addition, the method and system can include converting the AC power to a DC power supply using a converter and stepping down the voltage with a switching power supply.

In addition, the method and system can include the first radio processor card that is adapted to send a signal from the first radio transceiver and then to the first antennae and beam the signal from the first antennae to a second antenna.

The method and system also includes communicating the signal from the second antennae to a second radio transceiver and then to a second radio processor card to a client device.

Further, the method and system includes using the power from the switching power supply (to run the modem/router and the radio transceiver, as well as a plurality of heating and cooling devices, wherein the plurality of heating and cooling devices are adapted to heat or cool the contents of the housing.

The method and system also includes communicating the signal from the first radio transceiver to a first antenna, beaming the signal from the first antenna to a second antenna and communicating the signal from the second antenna to a second radio transceiver to a client device.

The method and system also includes communicating the signal from the first radio transceiver to a first antenna, beaming the signal from the first antenna to a second antenna and communicating the signal from the second antenna to a plurality of electronic devices comprising radio transceivers.

A wireless communication device for communicating information from a bidirectional high speed data cable modem via an Ethernet connection using a first radio transceiver at a first location and communicating with a second radio transceiver at a customer's premises can be used with the present method and system.

The wireless communication device can comprise a housing containing a bidirectional high speed data modem operably connected to a first radio transceiver, a first radio processor card, and a switching power supply. The device can further have a splitter adapted to engage the coaxial cable and split the RF spectrum signal from the AC power. The device can also have at least one heating and cooling device adapted to heat and cool contents of the housing.

Returning to FIG. 1, a cable modem/router (12), such as a DOCSIS cable modem/router, is disposed in a housing (13). The cable modem/router and housing are connected to a supporting strand (18), such as with a first mounting bracket (10) and a second mounting bracket (11). The supporting strand supports a fiber/coaxial cable (19). The housing is preferably water or weather resistant housing, such as one made from molded plastic, metal, a composite, a weatherproof water tight coated laminate or combinations thereof. The housing is large enough to hold the cable modem/router, at least one heating and/or cooling device, one or more radio transceivers, a power supply converter, thermostat (107), and associated cables. The housing can also include a lightning protector.

Figure 2:
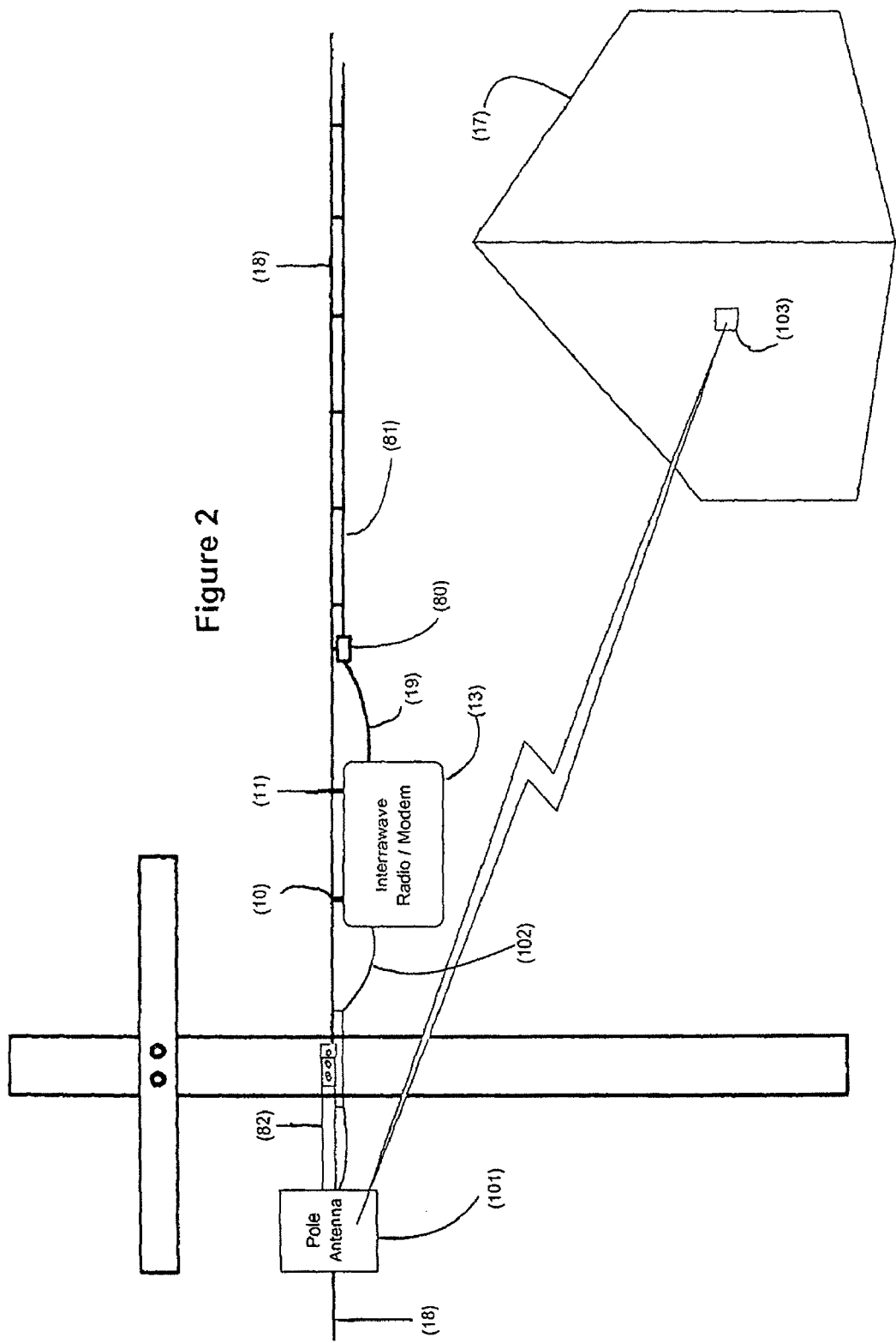
FIG. 2 depicts a detailed view of the strand with accompanying coaxial cable used in the method and system of FIG. 1.

The supporting strand (18) described in the invention is shown in detail in FIG. 2, wherein the strand supports the fiber/coaxial cable (19) which contains an RF spectrum signal (20), which is preferably a CATV signal, but can also be other types of signals. The RF spectrum signal can have digital content, such as digital music, and also return information, such as compressed video libraries. The coaxial cable (19) also provides a source of AC power (22) which is typically between approximately 50 volts up to and slightly exceeding 100 volts. In one embodiment, the supporting strand (18) and the fiber/coaxial cable (19) are sealed inside a material, such as rubber.

Returning now to FIG. 1, which shows a splitter (24), which can receive the input from the fiber/coaxial cable (19) and splits the input into an RF spectrum signal (20) and the AC power (22). Preferably the splitters accept a combined AC/RF signal fed into a single input, such as an F connector, and separates the combined AC/RF into two separate outputs, one being RF and the other being the AC power, each with their own connectors.

The RF spectrum signal is communicated to a bidirectional high speed data cable modem/router (12) which is can be a DOCSIS cable modem/router, such as a model PCX 100 manufactured by Toshiba of Tokyo Japan, or can be a similar data over cable system interface specification (DOCSIS) modem/router, such as those available from Cisco of Sunnyvale Calif. or Motorola of Arizona.

The cable modem/router (12) communicates with a first processor PCB (105) which can accommodate either one or two radio transceivers (15) over a cable (100) in an embodiment. The radio transceiver can be any wireless device or 802.11 X wireless device, such as an Orinoco Wireless networks radio transceiver or a Dell model 1150 True Mobile 11 Mbps Wireless LAN adapter or another compatible 802.11X receiver as known to one skilled in the art.

The first processor PCB (105), power supply (30), radio transceiver (15) and the cable modem/router (12) can be temperature regulated using first heating and/or cooling device (34) and optionally a second heating and/or cooling device (36). The first radio transceiver, cable modem/router, and heating and cooling devices in the housing (13) can all be powered from an AC to DC power supply (30) that can provide a plurality of DC power supplies (29a, 29b, 29c, 29d, and 2e) to each of these units.

The power results from the AC power being split from the coaxial cable then can be transmitted to a switching power supply such as a switching power supply from Integrated Power Design, which can convert and regulate the AC to DC power. The outputs are between about 0.1 volts to about 48 volts of DC current. One or more outputs of the switching power supply can have this voltage. In the embodiments, the outputs are between about 9 volts to about 12 volts each. The first processor card (105) can communicate with a radio transceiver (15).

The first radio transceiver (15) can further communicate with a first antenna (101) via an RF cable (102). Antennas manufactured by Arc Wireless of Denver, Colo. can be used in the invention, but additional antennas can also be used.

The first antenna (101) can wirelessly communicates with a second antenna (103) at a client's premise (17). The second antenna can communicate with a second radio transceiver (16) that can further communicate to a second processor card (106) that can further communicate to a client device (305) via an Ethernet cable (104).

In an embodiment, the first antenna can be fastened to a pole mounting bracket (82) that in turn can be further fastened to a utility pole for stability. The second antenna either can be roof mounted or mounted behind a non-metallic wall or window for communicating with the first antenna.

Figure 3:
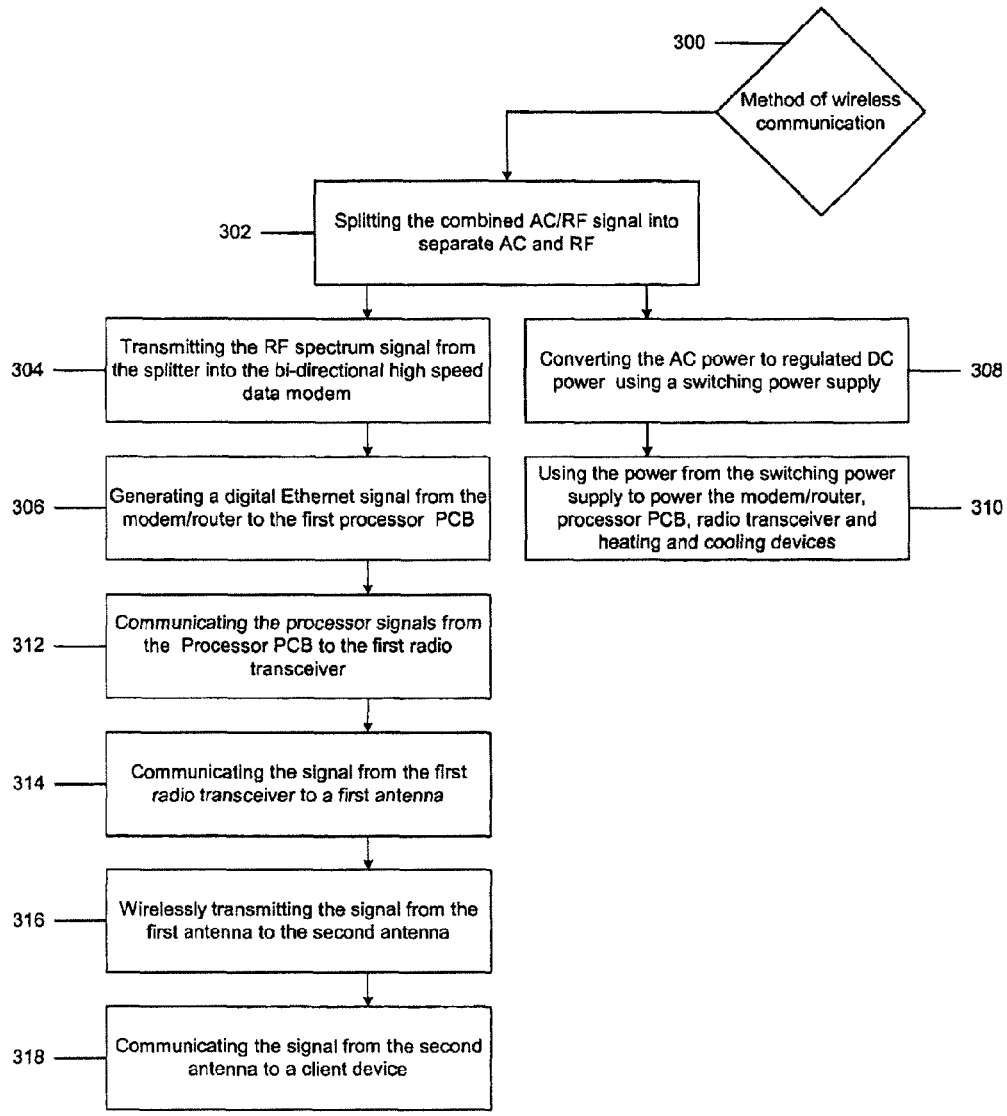
FIG. 3 is a schematic diagram of the steps used in the method.

FIG. 3 depicts an embodiment of the method.

The method (300) can generally includes wirelessly communicating information from a bidirectional high speed data cable modem/router in a housing via an Ethernet connection on a first radio transceiver communicating with a second radio transceiver at a customer's premises, wherein the housing connects to a supporting strand that supports a coaxial cable carrying a RF spectrum signal and AC power.

The method can generally includes splitting (302) the signal with an RF/power splitter from the coaxial cable into the RF spectrum signal and the AC power.

The method can further include transmitting (304) the RF spectrum signal from the splitter into the bidirectional high speed data cable modem/router and generating a digital Ethernet signal (306) from the modem/router to the first processor card and the first radio transceiver.

In addition, the method can include converting (308) the AC power to DC power using a converter and stepping down the voltage with a switching power supply. The switching power can then be used to supply power to the modem/router, processor and the radio transceiver, as well as a plurality of heating and cooling devices (310). The heating and cooling devices can be adapted to heat or cool the contents of the housing.

Continuing with FIG. 3, the processor signals are communicated from the processor PCB to the first radio transceiver (312). The method continues by communicating the signal (314) from the first radio transceiver to a first antenna, transmitting (316) the signal from the first antenna to a second antenna and communicating the signal (318) from the second antenna to a second radio transceiver then to a client device.

In an embodiment, the cable modem/router can perform half duplex communications. However, full duplex communications can also be appropriate depending upon a specific application.

Figure 4:
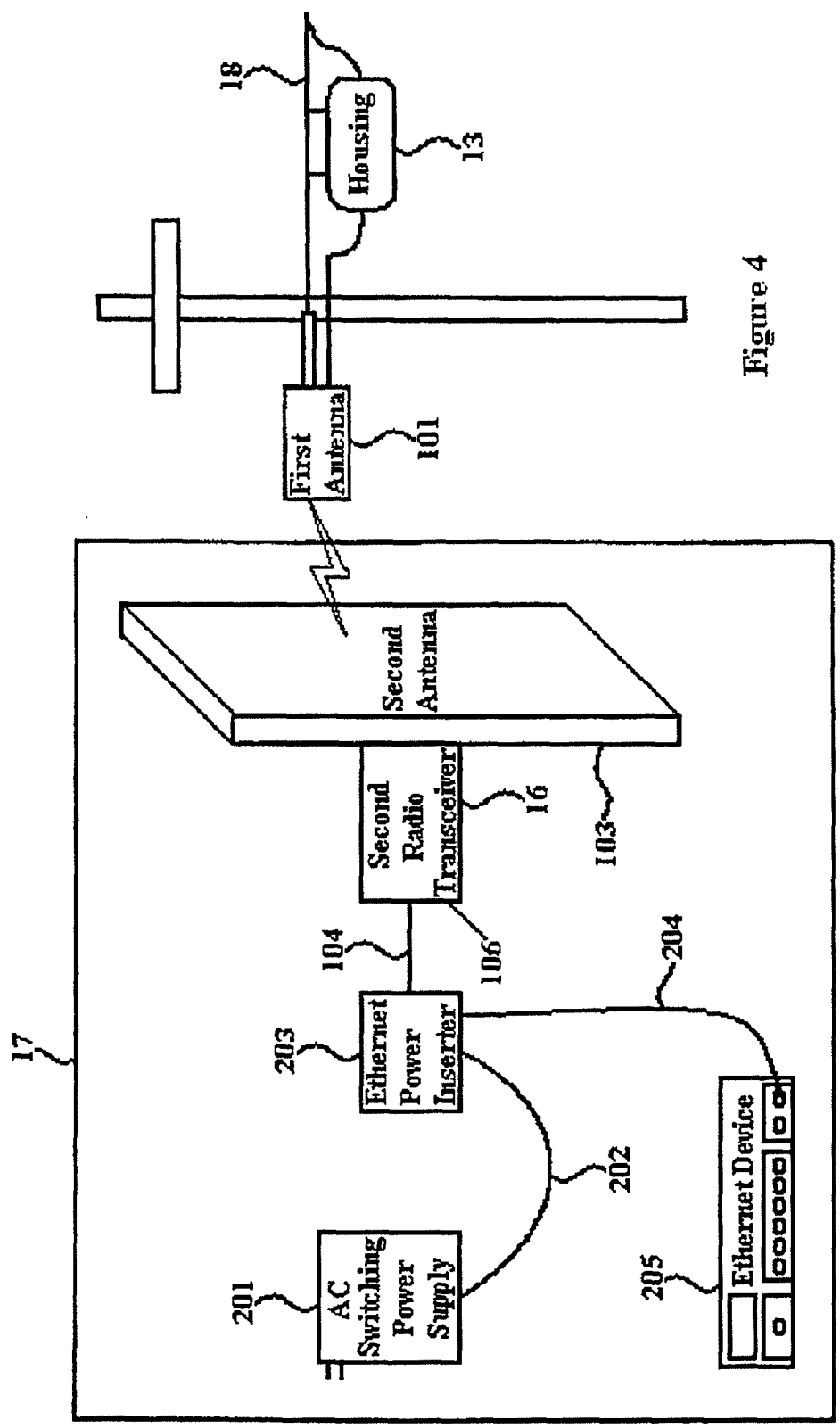
FIG. 4 depicts a view of the customer's site showing the equipment used in the method and system.

FIG. 4 shows the customer's premises using the equipment usable in the method and system of the invention. FIG. 4 shows that a signal from the first antenna (101) can be transmitted into a customer's premises (17). The signal can be received by the second antenna (103), which connects to the second radio transceiver (16). The 5 second transceiver (16) connects to a second radio processor card (106). The card (106) then transmits an Ethernet signal carried by a cable (104), which can be a Ethernet cable that communicates via a cable (204), to the customer's LAN or computer or other Ethernet device.

Power to operate the radio processor card (106) and the antenna (103) can be provided by a power over Ethernet system that includes an AC switching power supply (20 I) connected to a power cord (202), which is connected to an Ethernet power inserter (203), which delivers power across the Ethernet cable (104) to the processor card affiliated with the antenna (103). An antenna communicates with the second processor card and carries the bidirectional signal to the client's device (205) that can attach to a hub, switch, router or other Ethernet connection.

In one embodiment, the cable modem/router (12) communicates with a Wide Area network ("WAN") connection (20). In another embodiment, the processor card (16) communicates with a client device (205) such as a PC or Local Area network ("LAN") connection.

In one embodiment, the bidirectional high speed data modem/router is a data over cable system interface specification (OOCSIS) modem/router. The DOCSIS modem/router can have a functionality consisting of automatic registration, encryption, and automatic assignment of IP addresses.

In one embodiment, the client device can be a computer, a local area network (LAN), a network hub, a remote terminal unit for monitoring remote equipment, a digital camera, a fax, a phone, an Ethernet switch, a router, and combinations thereof.

The computer can be any micro processing device that includes processing and memory functions, such as a personal digital assistant, a notebook computer, a processor-equipped cellular phone or any other similar device.

The computer can further include a co-processor module, which includes a digital signal processor (DSP) to enhance processing capabilities and capacity of the computer. The DSP of the co-processor module can serve a variety of functions and operations, such as, supplying added encryption/decryption, communications, protocol handling and location capabilities, e.g., global positioning system calculations, for example. The co-processor module is particularly suited for enabling and enhancing operations of the computer according to the protocols and ASP services systems and methods described herein.

In one embodiment, the method and system can further include a housing to encase the splitter, first radio transceiver, converter, switching power supply and communication links. The housing can be formed of a material such as molded plastic, a metal, a composite material, weatherproof sealed coated laminate or combinations thereof.

In another embodiment, the method and system can further include a second transceiver disposed in the housing in parallel communication with the bidirectional high speed data modem/router. For example, the modem/router can be connected to the strand independent of connection to a utility pole.

In one embodiment, the housing can further include a detector for detecting a first location of the client device. For example, the detector is a computer. The invention is capable of the bi-directional transmission of such information that may be one or more signals such as data, phone, fax, video, audio, USB, Internet, multimedia or any combination thereof.

Figure 5:
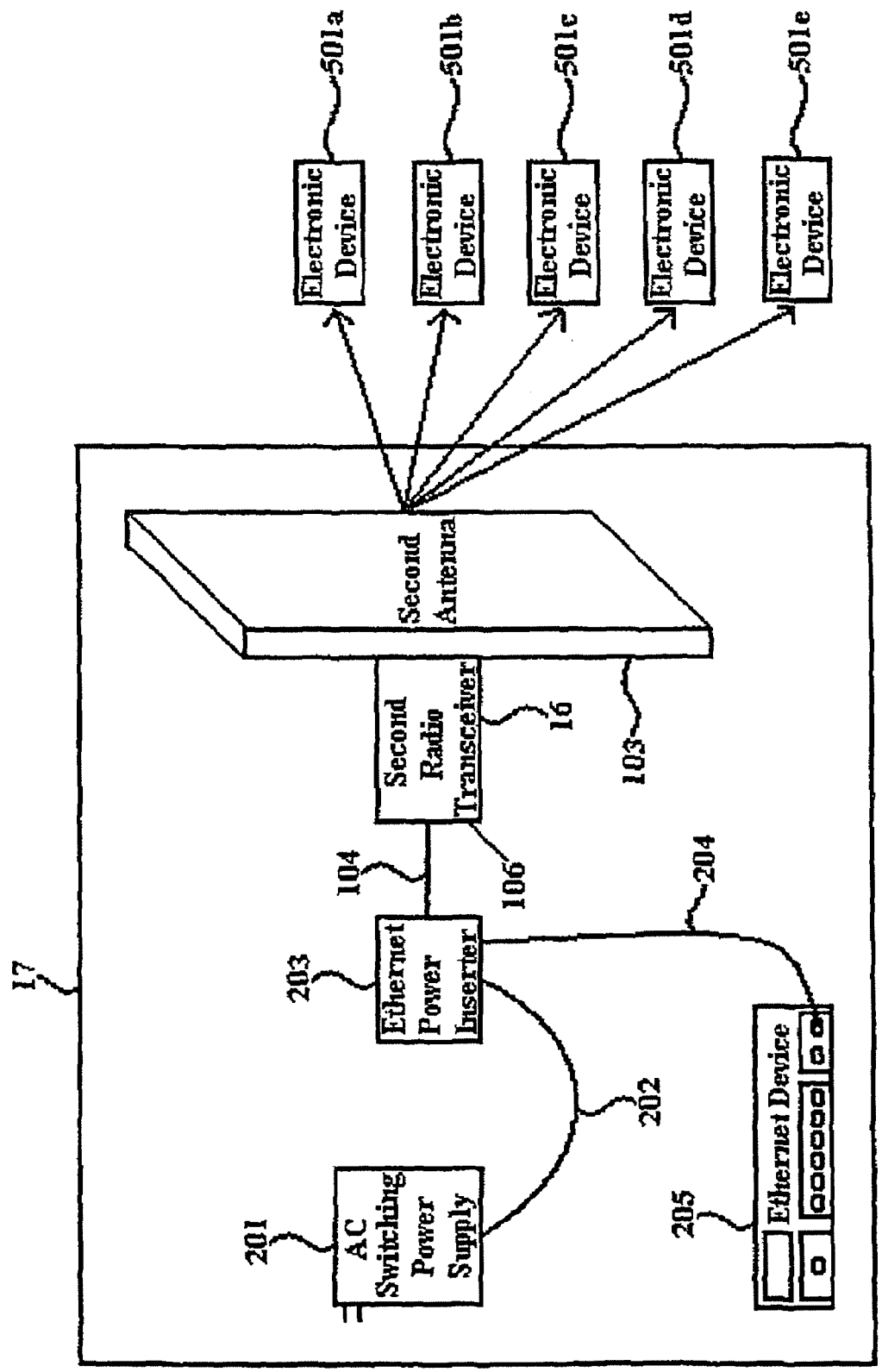
FIG. 5 is a diagram of the equipment used in an embodiment of the method and system.

FIG. 5 depicts the embodiment of the a method and system of wirelessly communicating information from a bidirectional high speed data cable modem via an Ethernet connection that uses a first radio transceiver at a first location and it communicates to a plurality of electronic devices. Each electronic device can include radio transceivers. The method and system can entail beaming the signal from the first antenna to at least one of a plurality of electronic devices (501$a$, 501$b$, 501$c$, 501$d$, and 501$e$).

Examples of electronic devices (501$a$, 501$b$, 501$c$, 501$d$, and 501$e$) can be laptops, PCs computers, personal digital assistants (PDA), personal electronic devices communicating with satellites, cell phones, GPS location devices, or other mobile electronic devices that can interface to networks. The radio transceiver card installed in the electronic devices can be card rated IEEE 802.11b or 802.11g card or a similar type card.

The method and system creates a public access area known as a "hot spot" from the housing. The housing can contain modems and other equipment to connect to the electronic devices for public high speed internet access. The method and system can additionally include authentication techniques to enable access by a user using a defined protocol, such as a set of e-mail addresses.

The method and system can also be adapted to comprise a technique, such as management techniques, billing techniques, accounting techniques, reporting techniques, and combinations thereof. These techniques can enable additional reports on at least one of the electronic devices.

The method and system can also include the unique features including a. capable of incorporating any cable modem/router into the device that meets the enclosures size and power requirements;

b. capable of providing point-to-point and or point-to-multipoint transmission of secure non 802.11X signal using inexpensive 802.11X hardware;

c. usable as a standard 802.11X access point allowing users to access high speed internet and/or local area networks wirelessly;

d. usable as a 802.11X "Hot Spot" device with the ability to communicate with a AAA appliances or any other 802.11X wireless device and allow clients high speed internet access through various means of authentication such as, but not limited to a user's email address or credit card information;

e. ability to change operation of the device to any of the above through changes in software switches; and f. usable as a unique pole mounting bracket that allows for a stable mounting of the antenna that in most cities does not require a permit because no contact with the utility pole itself is made.

The method and system can use a wireless communication system. The system communicates the information using a first radio transceiver at a first location and sends the information to a second radio transceiver at a customer's premises.

The system can include a housing containing a bidirectional high speed data modem/router operably connected to a first radio transceiver, a first radio processor card, and a switching power supply. The housing can be operably connected to a supporting cable strand. The supporting cable strand can simultaneously support a coaxial cable carrying an RF spectrum signal and an AC power signal. The system can have at least one heating and cooling device to heat and cool contents of the housing.

The system can also include a splitter adapted to engage the coaxial cable and split the RF spectrum signal from the AC power.

The first radio processor card can be adapted to send a signal from the first radio transceiver, send the same signal to the first antenna, and then beam the signal from the first antenna to a second antenna.

The system can also adapted to communicate the signal from the second antenna to a second radio transceiver and then to a second radio processor card and then to a client device.

The method can use of a device that can include a housing with a bidirectional high speed data modem/router operably connected to a first radio transceiver, a first radio processor card, and a switching power supply. The splitter can be adapted to engage the coaxial cable and split the RF spectrum signal from the AC power. The device can include at least one heating and cooling device adapted to heat and cool contents of the housing.

While these embodiments have been described with emphasis on the preferred embodiments, it should be understood that within the scope of the appended claims, these embodiments might be practiced other than as specifically described herein.

What is claimed is:

1. A method of wirelessly communicating information from a bidirectional high speed DOCSIS cable modem via a data connection using a first radio transceiver at a first location and a second radio transceiver at a second location, the method comprising the steps of:

attaching a weather resistant housing containing (i) the bidirectional high speed DOCSIS cable modem, (ii) the first radio transceiver, (iii) a first processor, and (iv) a power supply, to an outdoor cable strand using a mounting bracket, wherein the cable strand supports a shielded two-conductor coaxial cable simultaneously carrying an RF data signal and cable AC power, the mounting bracket having a height configured to position a top of the housing vertically below a point at which the coaxial cable is supported by the strand;

using a splitter to engage the shielded two-conductor coaxial cable and split the RF data signal from the cable AC power;

providing the RF data signal from the splitter to the bidirectional high speed DOCSIS cable modem, and providing the cable AC power to the power supply;

providing a digital signal, corresponding to the RF data signal, from the bidirectional high speed DOCSIS cable modem to the first processor;

converting the cable AC power to DC power and stepping down the voltage with the power supply;

using the DC power from the power supply to run the bidirectional high speed DOCSIS cable modem, the first radio transceiver, and the first processor;

communicating the digital signal from the first processor to the first radio transceiver;

providing a transmission signal, corresponding to the communicated digital signal, from the first radio transceiver to a first antenna;

beaming a wireless signal, corresponding to the transmission signal, from the first antenna to a second antenna on a mobile user device; and communicating the beamed signal from the second antenna to the second radio transceiver and then to a second processor, both contained within the user device.

2. The method of claim 1, wherein the bidirectional high speed data modem communicates with a Wide Area Network ("WAN") connection.

3. The method of claim 1, wherein the bidirectional high speed data modem wirelessly communicates with a Local Area Network ("LAN") connection.

4. The method of claim 1, further comprising the step of arranging a plurality of housings in a network, and wherein backhaul communications of the network are carried over plural shielded two-conductor coaxial cables.

5. The method of claim 1, wherein the DOCSIS modem has a functionality comprising automatic registration, encryption, and automatic assignment of IP addresses.

6. The method of claim 1, wherein the mobile user device comprises at least one of a computer, a portable computer, a local area network (LAN), a network hub, a remote terminal unit for monitoring remote equipment, a digital camera, a fax, a phone, a mobile phone, an Ethernet switch, and a router.

7. The method of claim 1, wherein the housing is formed of a material comprising at least one of molded plastic, a metal, a composite material, and weatherproof sealed coated laminate.

8. The method of claim 7, wherein the first transceiver is disposed in parallel communication with a further transceiver disposed in the housing.

9. The method of claim 1, wherein the housing is connected to the strand independent of a connection to a utility pole.

10. The method of claim 1, wherein the housing further comprises a detector for detecting a first location of the client device.

11. The method of claim 1, wherein the bidirectional high speed cable modem comprises a router.

12. The method of claim 1, further comprising providing cooling structure to the housing.

13. The method of claim 1, further comprising providing cooling and heating structure to the housing.

14. The method of claim 1, further comprising the step of disposing a location device in the housing.

15. The method of claim 1, wherein the bidirectional high speed data modem, the first radio transceiver, the first processor, and the power supply, are all mounted on a single device.

16. The method of claim 1, further comprising the step of using at least one software component to change the operation of at least one of: the bidirectional high speed cable modem, the first radio transceiver, and the first processor.

17. The method of claim 1, wherein at least one of: the first radio transceiver, and the first processor, comprises a card.

18. The method of claim 1, further comprising the step of attaching two mounting brackets to the housing.

19. The method of claim 1, wherein the housing includes plural radio transceivers.

20. The method of claim 1, further comprising the step of providing a GPS location device in communication with the first processor and configured to detect the location of the housing.

21. The method of claim 1, wherein the housing is weatherproof.

22. The method of claim 21, wherein the housing is sealed.

23. The method of claim 1, further comprising a lightning protection device coupled to the housing.

24. The method of claim 1, wherein the splitter is disposed inside the housing.

25. The method of claim 1, wherein the step of attaching the housing includes the step of attaching the mounting bracket to the housing and to an aerial outdoor cable strand.

26. A method of wirelessly communicating information from a bidirectional high speed DOCSIS cable modem using a first radio transceiver at a first location and a second radio transceiver at a second location, the method comprising the steps of:
   attaching a housing containing (i) the bidirectional high speed DOCSIS cable modem coupled to the first radio transceiver, (ii) a first radio processor, and (iii) a power supply, directly to an outdoor aerial cable strand using a mounting structure, wherein the aerial cable strand supports a shielded two-conductor coaxial cable simultaneously carrying an RF data signal and cable AC power, the mounting structure having a height configured to position a top of the housing vertically below a point at which the coaxial cable is supported by the aerial cable strand;
   using a splitter to engage the shielded two-conductor coaxial cable and split the RF data signal from the cable AC power;
   transmitting the RF data signal from the splitter to the bidirectional high speed DOCSIS cable modem, and transmitting the cable AC power from the splitter to the power supply;
   providing a digital signal, corresponding to the RF data, from the bidirectional high speed DOCSIS cable modem to the first radio processor;
   converting the cable AC power to DC and stepping down the voltage with the power supply;
   using the DC power from the power supply to run the bidirectional high speed DOCSIS cable modem, the first radio transceiver, and the first radio processor;
   communicating the digital signal from the first radio processor to the first radio transceiver and then, communicating a corresponding transmission signal to a first antenna;
   wirelessly transmitting a wireless signal corresponding to the transmission signal from the first antenna to a second antenna; and
   communicating a digital signal, corresponding to the received wireless signal, from the second antenna to the second radio transceiver, and then communicating a signal corresponding to the digital signal to a second radio processor; the second antenna, the second radio transceiver, and the second radio processor being contained in a user device.

27. A method according to claim 26, further comprising the step of arranging a plurality of housings in a network, and wherein backhaul communications of the network are carried over plural shielded two-conductor coaxial cables.

28. A method according to claim 26, further comprising the step of disposing a location device in the housing.

29. A method according to claim 26, further comprising the step of disposing cooling structure configured to provide cooling to the housing.

30. A method according to claim 26, further comprising the step of disposing cooling and heating structure configured to provide cooling and heating to the housing.

31. A method according to claim 26, wherein the mounting structure comprises two mounting brackets.

32. A method according to claim 26, wherein the bidirectional high speed DOCSIS cable modem, the first radio transceiver, the first processor, and the power supply, are all mounted on a single device.

33. A method according to claim 26, further comprising the step of using at least one software component to change the operation of at least one of: the bidirectional high speed DOCSIS cable modem, the first radio transceiver, and the first processor.

34. A method according to claim 26, wherein at least one of: the first radio transceiver, and the first processor, comprises a card.

35. A method according to claim 26, wherein the housing includes plural radio transceivers.

36. A method according to claim 26, further comprising a GPS location device in communication with the first radio processor.

37. The method of claim 26, wherein the step of attaching the housing includes the step of attaching two mounting structures to an aerial outdoor cable strand.

38. The method of claim 26, wherein the user device comprises at least one of a computer, a local area network, a network hub, a remote terminal unit for monitoring remote equipment, a fax, a phone, an Ethernet switch, and a router.

39. The method of claim 26, wherein the user device comprises at least one of a laptop, a personal digital assistant, a personal electronic device communicating with a satellite, a cell phone, a GPS location device, and a digital camera.

40. The method of claim 26, wherein the second antenna, the second radio transceiver, and the second radio processor being contained in a mobile user device.

41. The method of claim 26, wherein the step of communicating the digital signal from the second antenna includes the step of communicating the digital signal from the second antenna to the second radio transceiver, and then communicating a signal corresponding to the digital signal to the second radio processor, and then to a separate user device.

42. A method of wirelessly communicating information from a bidirectional high speed DOCSIS cable modem via a data connection using (i) a first radio transceiver at a first location and (ii) a plurality of electronic devices, each comprising a radio transceiver, at locations other than the first location, the method comprising the steps of:
   attaching a housing containing (i) the bidirectional high speed DOCSIS cable modem, (ii) the first radio transceiver, (ii) a first radio processor, and (iii) a power supply, to an outdoor cable strand using a mounting structure, wherein the cable strand supports a shielded two-conductor coaxial cable simultaneously carrying an RF data signal and cable AC power, the mounting structure having a height configured to position a top of the housing vertically below a point at which the coaxial cable is supported by the strand;
   using a splitter to engage the shielded two-conductor coaxial cable and split the RF data signal from the cable AC power;

transmitting, from the splitter, the RF data signal to the bidirectional high speed DOCSIS cable modem, and the AC power to the power supply;

providing a digital signal, corresponding to the RF data signal, from the bidirectional high speed DOCSIS cable modem to the first radio processor;

converting the cable AC power to DC power and stepping down the voltage with the power supply;

providing the DC power from the power supply to the bidirectional high speed DOCSIS cable modem, the first radio transceiver, and the first radio processor;

communicating the digital signal from the first radio processor to the first radio transceiver, and then providing a transmission signal, corresponding to the digital signal, to a first antenna; and transmitting a wireless signal, corresponding to the transmission signal, from the first antenna to at least one transceiver of the plurality of electronic devices.

43. A method according to claim 42, wherein the power supply comprises a switching power supply.

44. A method according to claim 42, wherein the mounting structure comprises plural mounting brackets.

45. A method according to claim 42, further comprising the step of arranging a plurality of housings in a network, and wherein backhaul communications of the network are carried over plural shielded two-conductor coaxial cables.

46. A method according to claim 42, further comprising cooling structure configured to provide cooling to the housing.

47. A method according to claim 42, further comprising cooling and heating structure configured to provide cooling and heating to the housing.

48. The method of claim 42, further comprising the step of disposing a location device in the housing.

49. A method according to claim 42, wherein the bidirectional high speed DOCSIS cable modem, the first radio transceiver, the first processor, and the power supply, are all mounted on a single device.

50. A method according to claim 42, further comprising the step of using at least one software component to change the operation of at least one of: the bidirectional high speed DOCSIS cable modem, the first radio transceiver, and the first processor.

51. A method according to claim 42, wherein the housing includes plural radio transceivers.

52. A method according to claim 42, further comprising the step of providing a GPS location device in communication with the first radio processor.

53. The method of claim 42, wherein the step of attaching the housing includes the step of attaching the mounting structure to an aerial outdoor cable strand.

54. The method of claim 42, wherein the plurality of electronic devices comprises at least one mobile device.

55. The method of claim 42, wherein the plurality of electronic devices comprises at least one non-mobile device.

56. A method of arranging a wireless communication device, comprising:

providing a weather-resistant housing having disposed therein: (i) a DOCSIS cable modem, (ii) a radio transceiver, (iii) a radio processor, and (iv) a power supply, the housing further having mounting structure configured to hang the housing from an outdoor aerial cable strand such that a top of the housing hangs below a point at which a shielded two-conductor coaxial cable is supported by the strand;

providing a connector coupled to the housing and configured to couple to the shielded two-conductor coaxial cable that provides both an RF signal and AC power;

providing a splitter connected to the connector and configured to split the RF signal from the AC power, such that the RF signal is provided to the DOCSIS cable modem and the AC power is supplied to the power supply; and coupling an antenna to the housing and to the radio transceiver.

57. The method of claim 56, further comprising the step of providing at least one cooling structure configured to cool contents of the housing.

58. The method of claim 56, further comprising the step of arranging a plurality of housings in a network, and wherein backhaul communications of the network are carried over plural shielded two-conductor coaxial cables.

59. The method of claim 56, wherein the housing is connected to the strand independent of a connection to a utility pole.

60. The method of claim 56, wherein the mounting structure is configured to hang the housing from more than one point on the cable strand.

* * * * *

UNITED STATES PATENT AND TRADEMARK OFFICE
CERTIFICATE OF CORRECTION

| | | |
|---|---|---|
| PATENT NO. | : 8,340,064 B2 | Page 1 of 1 |
| APPLICATION NO. | : 12/964113 | |
| DATED | : December 25, 2012 | |
| INVENTOR(S) | : Smith | |

It is certified that error appears in the above-identified patent and that said Letters Patent is hereby corrected as shown below:

On Title Page 2, Item (56), under "OTHER PUBLICATIONS", in Column 2,
Line 7, delete "reiview" and insert -- review --, therefor.

In the Specification

In Column 5, Line 24, delete "The 5 second" and insert -- The second --, therefor.

In Column 5, Line 27, delete "be a" and insert -- be an --, therefor.

In Column 5, Line 43, delete "(16)" and insert -- (106) --, therefor.

In Column 5, Line 48, delete "(OOCSIS)" and insert -- (DOCSIS) --, therefor.

In Column 6, Line 53, delete "including" and insert -- including: --, therefor.

Signed and Sealed this
Sixth Day of August, 2013

Teresa Stanek Rea
*Acting Director of the United States Patent and Trademark Office*